United States Patent [19]

Ehrbar

[11] Patent Number: 5,266,008
[45] Date of Patent: Nov. 30, 1993

[54] FAIL-SAFE NUT RETAINER FOR A HELICOPTER

[75] Inventor: James J. Ehrbar, Mesa, Ariz.

[73] Assignee: McDonnell Douglas Helicopter Company, Mesa, Ariz.

[21] Appl. No.: 969,534

[22] Filed: Oct. 30, 1992

Related U.S. Application Data

[63] Continuation of Ser. No. 696,639, May 7, 1991, abandoned.

[51] Int. Cl.⁵ .............................................. B63H 1/20
[52] U.S. Cl. ........................ 416/204 R; 416/244 R; 411/429; 411/432
[58] Field of Search ............... 416/244 R, 134 A, 140, 416/204, 100–107; 411/427, 429, 430, 371, 432, 910; 403/11, 12

[56] References Cited

U.S. PATENT DOCUMENTS

| | | | |
|---|---|---|---|
| 2,571,265 | 10/1951 | Leufven | 416/244 |
| 3,261,254 | 7/1966 | Pinkerton | 411/910 |
| 4,182,215 | 1/1980 | Green et al. | 92/17 |
| 4,435,100 | 3/1984 | Cox | 403/11 |
| 4,880,344 | 11/1989 | Henry et al. | 411/429 |
| 5,069,587 | 12/1991 | Levenstein | 411/432 |

Primary Examiner—Thomas E. Denion
Attorney, Agent, or Firm—Donald E. Stout; John P. Scholl

[57] ABSTRACT

A main rotor head is disclosed, which is adapted for mounting on a main rotor mast of a helicopter. A main rotor mast nut is threaded onto the main rotor mast in order to fasten the main rotor head to the mast. The key feature of the invention is a nut retention means, which comprises a cup-shaped round annular disk and closely surrounds the nut, preventing separation of the main rotor head from the main rotor mast should the nut fail during flight.

17 Claims, 2 Drawing Sheets

FAIL-SAFE NUT RETAINER FOR A HELICOPTER

The U.S. Government has rights in this invention pursuant to contract number DAAJ09-89-C-A003 awarded by the Department of the Army.

This is a continuation of application Ser. No. 07/696,639, filed May 7, 1991, now abandoned.

BACKGROUND OF THE INVENTION

1. Technical Field

This invention relates to threaded fasteners for attaching the main rotor head to the main rotor mast of a helicopter, and more particularly to a nut retainer for ensuring that the rotor head assembly and rotor mast do not disengage even if the main rotor mast nut cracks or otherwise fails.

2. Background Information

Helicopters today typically have a main rotor head to which the rotor blades are attached. This main rotor head is in turn fastened to a main rotor mast by means of a main rotor mast nut (commonly called a "Jesus" nut). Viewing FIG. 1, which depicts a typical prior art attachment scheme for a main rotor head and mast assembly 8, a main rotor head 10 is attached to a main rotor mast 16 by means of a main rotor mast nut 20. Internal threads 22 on the nut 20 engage with external threads 34 on the mast 16 when the nut 20 is tightened down onto the mast 16, thereby completing the attachment of the assembly 10 to the mast 16. A plurality of threaded jack bolts 36 extend through the substantially round nut 20 and are torqued sequentially to engage respective threaded apertures (not shown) in a bearing inner race 38, thereby tightening down the nut 20 and properly pre-tensioning the mast 16, while requiring several orders of magnitude less torque than would be required by the nut 20 if it were tightened directly. The main rotor head 10 includes a plurality of rotor thrust bearings 43, which each comprise the bearing inner race 38 referenced above and a roller 44, the rollers 44 being protected from dirt and other contaminants by a seal 46. Seal 46 is retained in position outboard of the nut 20 by means of a seal retainer 48, which comprises a cup-shaped round annular disk which circumscribes the main mast 16 outwardly of the nut 20 and has an upwardly extending lip 50. A substantial gap or space 52 exists between the outer circumferential edge of the nut 20 and the inner circumferential edge of the retainer 48.

It can sometimes occur, during the course of repeated operation of the helicopter and its associated rotor system, that the nut 20 develops cracks or other such structural weaknesses due to fatigue and vibrational stresses which may over time cause the nut to fail during flight. Such a failure would permit the main rotor head 10, including the rotor blades (not shown) to separate from the main rotor mast 16, causing an inevitable crash with probable catastrophic consequences.

One present solution to the problem of main rotor nut cracking and failure is to establish a visual inspection program. Such a program, although labor intensive and expensive in terms of aircraft down-time, is essential for so critical a part. However, it is not foolproof, since cracks could propagate between inspections and cause a failure before being detected by inspection personnel. Also, it is possible that less obvious cracks could be missed by the inspectors. Unless inspections are conducted after every flight, a monumentally expensive and impractical undertaking, it is clear that a further solution is needed to supplement a periodic inspection program.

A second solution to the cracking problem is to manufacture the nut from a more crack-resistant material. This will reduce the risk that cracks will propagate in the nut, and thus reduce the risk of nut failure. However, this solution is also not a complete one, since no material is totally immune to failure.

What is needed is a means for retaining the nut in position on the mast even if it fails, essentially serving as a back-up safety device which would allow a pilot to guide the helicopter to a safe emergency landing and thereby avoid a catastrophic result.

SUMMARY OF THE INVENTION

This invention solves the problem outlined above by utilizing a main rotor mast nut retainer to retain the nut in position even in the event that it should crack and fail in flight. In one aspect of the invention, a main rotor mast nut assembly for a helicopter comprises a main rotor mast nut which has a threaded inner surface. The nut is adapted to be threaded onto a threaded outer surface of the helicopter main rotor mast to thereby engage the main rotor mast, as is known in the art. The main rotor mast nut assembly further includes a nut retention means which is adapted to prevent disengagement of the mast nut and the main rotor mast should the nut crack or otherwise fail. By preventing disengagement of the nut and the mast, the main rotor head is prevented from separating from the helicopter, and a safe landing of the helicopter is possible.

In another aspect of the invention, a main rotor head and mast assembly for a helicopter includes a main rotor head through which a main rotor mast extends. The main rotor mast has a threaded outer surface. A main rotor mast nut has a threaded inner surface and is adapted to be threaded onto the threaded outer surface of the main rotor mast, thereby engaging the main rotor mast and the main rotor head. A nut retention means prevents disengagement of the mast nut and the mast should the nut crack or otherwise fail.

A key feature of the nut retention means is that it closely surrounds the main rotor mast nut so that there is substantially no space between the nut and the nut retention means. Consequently, should the nut fail, the close proximity of the retention means holds the nut in place until repairs can be initiated.

The above mentioned and other objects and features of this invention and the manner of attaining them will become apparent, and the invention itself will be best understood, by reference to the following description taken in conjunction with the accompanying illustrative drawings.

DETAILED DESCRIPTION OF THE INVENTION

Figure 1:
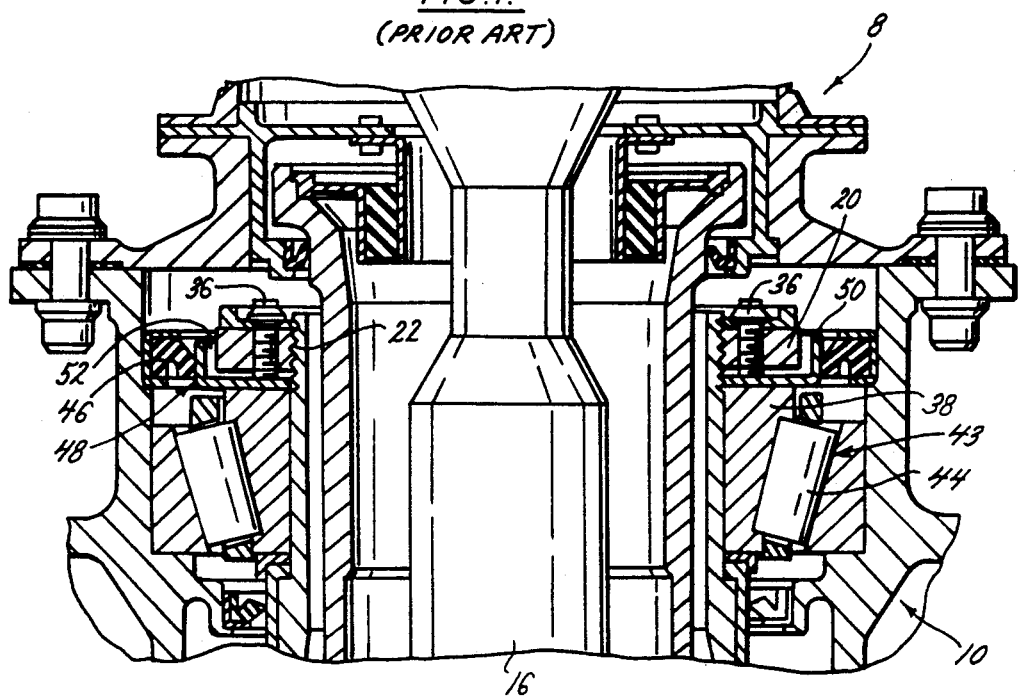
FIG. 1 is a cross-sectional view showing a prior art configuration of a main rotor head and mast assembly for a helicopter.
Figure 3:
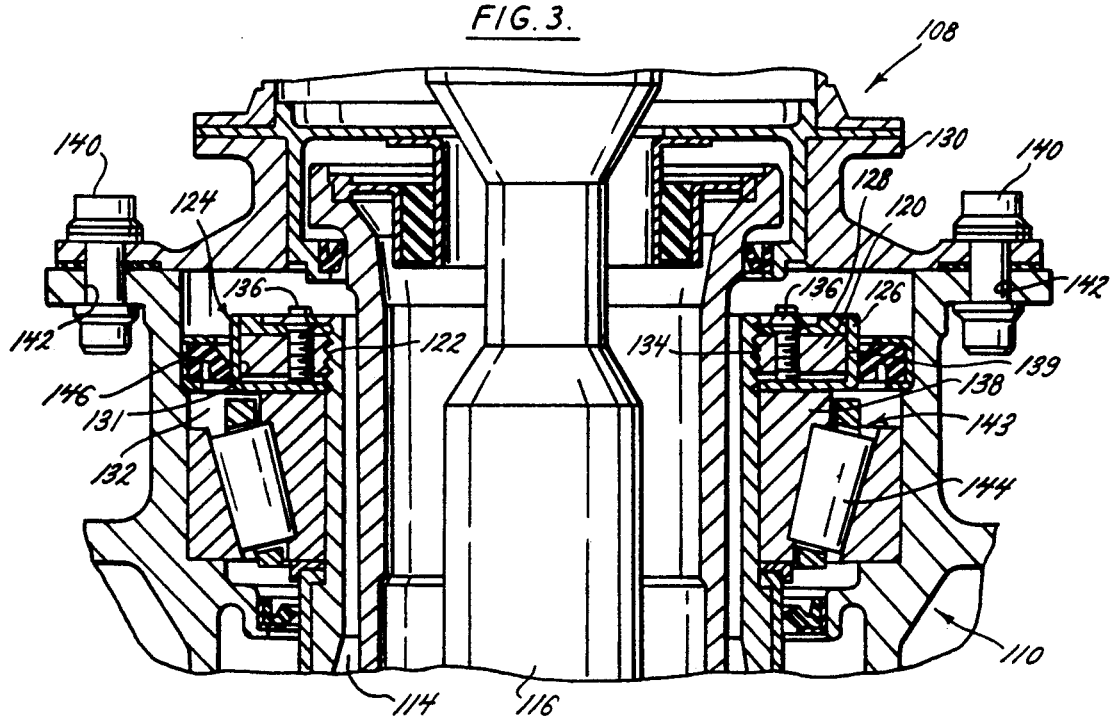
FIG. 3 is a cross-sectional view similar to FIG. 1 showing the main rotor head depicted in FIG. 2 assembled to a main rotor mast.
Figure 2:
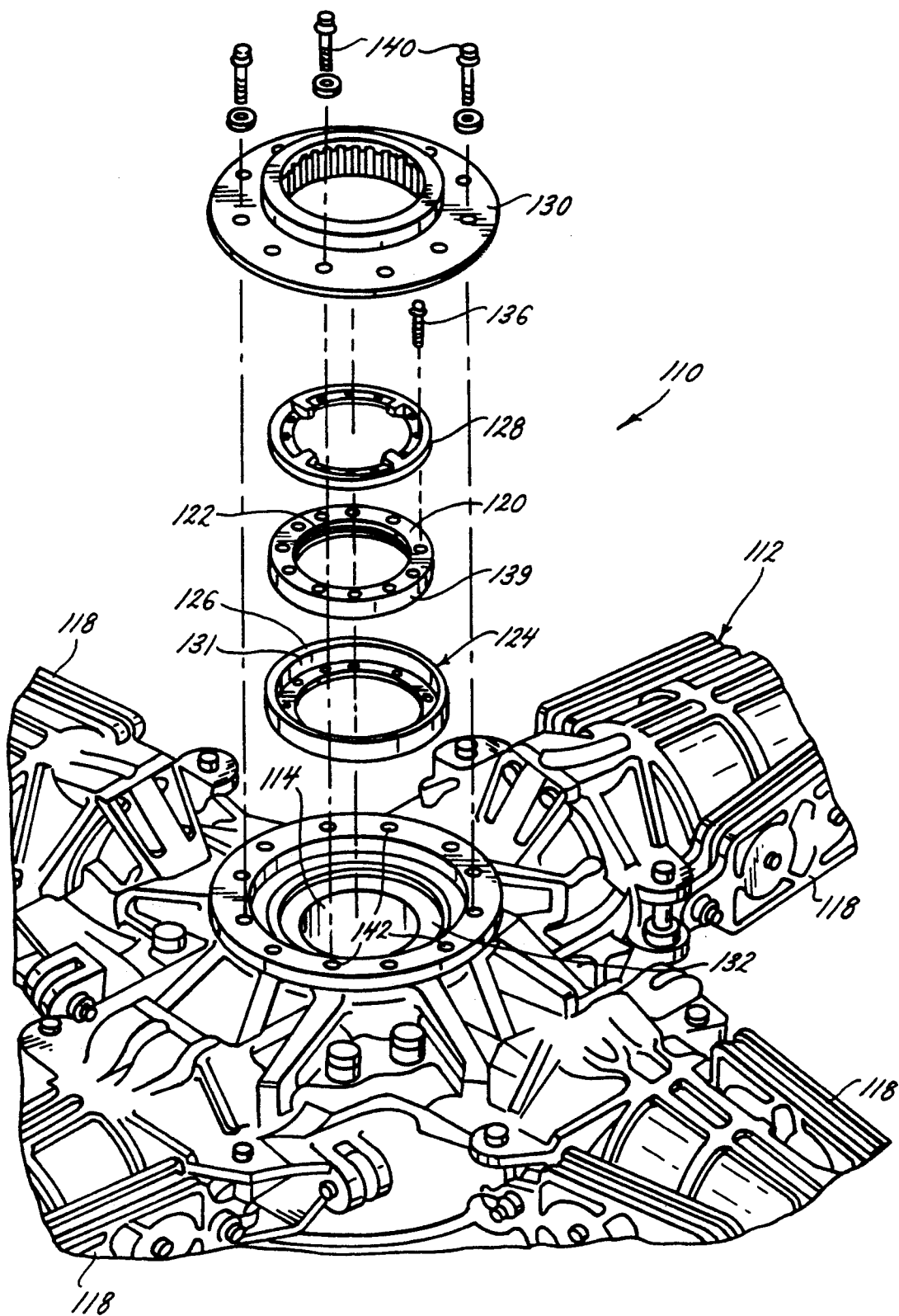
FIG. 2 is an exploded perspective view of a main rotor head incorporating the improvements of the claimed invention.

Referring now to the drawings, FIGS. 2 and 3 show a main rotor head constructed according to the invention. The embodiment shown in FIG. 3 is identical in all respects with that of the prior art FIG. 1 except as described and shown herein. Each of the elements in FIGS. 2 and 3 corresponding to equivalent elements in FIG. 1 are designated by the same reference numeral, preceded by the numeral 1. Thus, a helicopter main rotor head and mast assembly 108 includes a main rotor head 110 which in turn comprises a pitch housing 112. Through the center of the pitch housing 112 is an opening 114 for mounting the main rotor head 110 on a main rotor mast 116. The pitch housing 112 comprises four segments 118, on the end of each of which may be attached a rotor blade (not shown). Remaining elements of the main rotor head 110 include a main rotor mast nut 120, having internal threads 122, a nut retainer 124, which comprises a cup-shaped round annulus or disk having an upwardly extending lip 126, a ring cap 128, and a main rotor top cap 130. The lip 126 of the nut retainer 124 has an internal circumferential surface 131.

To assemble the main rotor head 110 to the main rotor mast 116, the pitch housing 112 is first mounted onto the mast 116, so that the mast extends through the opening 114, as above described. Then, nut retainer 124 is mounted onto the mast 116 above the pitch housing, being positioned to rest within recess 132 on the pitch housing 112, above the opening 114. Nut 120 is then threaded onto the mast 116 above the retainer 124, with its internal threads 122 interengaging with external threads 134 on the mast 116. The nut 120 is tightened to a predetermined torque level by sequential tightening of a plurality of jackbolts 136 into respective apertures (not shown) in a bearing inner race 138 within recess 132. The nut 120, which is preferably round in shape, has an external circumferential surface 139. Once nut 120 has been properly tightened, ring cap 128 and the main rotor top cap 130 are positioned on the mast 116 and securely fastened by tightening bolts 140 into threaded apertures 142 on the pitch housing 112.

Within the main rotor head 110 are a plurality of rotor thrust bearing 143, which each comprise the bearing inner race 138 referenced above and a roller 144, the rollers 144 being protected from dirt and other contaminants by a seal 146. The major difference between the prior art embodiment of FIG. 1 and the inventive embodiment of FIG. 3 is that the seal retainer 48 of the FIG. 1 embodiment has been inventively adapted to serve a second and very crucial purpose. In FIG. 1, a significant gap or space 52 is maintained between the upwardly extending lip 50 of the seal retainer 48 and the main rotor mast nut 20. On the other hand, in FIG. 3, there is substantially no gap or space between the upwardly extending lip 126 of the nut retainer 124 and the main rotor mast nut 120. Essentially, the inner circumferential surface 131 of the nut retainer lip 126 and the outer circumferential surface of the nut 120 are in substantial contact when both elements are in proper assembled position. As a result, the nut retainer 124 still performs exactly the same seal retention function as does the seal retainer 48 of the prior art embodiment in exactly the same manner, but it additionally performs the function of a nut retainer because of its close proximity to the nut 120.

In operation, the main rotor head 110 rotates on the main rotor mast 116 during flight, in turn rotating the rotor blades of the helicopter. Should cracks develop in the main rotor mast nut 120, eventually causing the nut to fail, nut retainer 124 retains the nut 120 in position on the mast 116, because of the fact that the lip 126 closely surrounds the nut 120. The close proximity of the lip 126 to the nut 120 prevents the nut from flying radially outwardly away from the mast 116 upon failure, thereby allowing the pilot sufficient time to safely guide the craft to an emergency landing and preventing a disastrous crash.

In the preferred embodiment, elimination of the gap or space 52 in the prior art embodiment of FIG. 1 is accomplished by substituting a retention nut 120 having a diameter larger than that of the nut formerly employed by an amount equivalent to the size of the gap. Of course, however, other means for eliminating the gap could be employed, such as decreasing the diameter of the retainer, without changing or affecting the scope of the invention. Furthermore, other means for retaining the nut 120 could be employed, such as an additional nut retaining element, as would be apparent to one of ordinary skill in the art.

Although an exemplary embodiment of the invention has been shown and described, many changes, modifications, and substitutions may be made by one having ordinary skill in the art without departing from the spirit and scope of the invention.

What is claimed is:

1. A main rotor mast nut assembly for a helicopter, comprising:
   a main rotor mast nut having a threaded inner surface, said nut being adapted to be threaded onto a threaded outer surface of a main rotor mast to engage the main rotor mast; and
   a nut retention means adapted to prevent disengagement of said mast nut and the main rotor mast should said nut crack or otherwise fail;
   wherein said nut retention means does not substantially assist in engaging said nut and said mast except in the event of nut cracking or failure.

2. The main rotor mast nut assembly as recited in claim 1, wherein said nut retention means closely surrounds said main rotor mast nut, such that there is substantially no space between said nut and said nut retention means.

3. The main rotor mast nut assembly as recited in claim 1, wherein said nut retention means comprises a substantially circular annulus having an inner circumferential surface.

4. The main rotor mast nut assembly as recited in claim 3, wherein said main rotor mast nut is substantially circular and has an outer circumferential surface, said nut retention annulus being adapted to closely surround said nut, such that there is substantially no space between the outer circumferential surface of said mast nut and the inner circumferential surface of said nut retention annulus.

5. The main rotor mast nut assembly as recited in claim 1, wherein said nut retention means comprises a substantially circular annulus having an upwardly extending lip, said lip having an inner circumferential surface.

6. The main rotor mast nut assembly as recited in claim 5, wherein said main rotor mast nut is substantially circular and has an outer circumferential surface, said nut retention annulus being adapted to closely surround said nut, such that there is substantially no space between the outer circumferential surface of said mast nut and the inner circumferential surface of the lip of said nut retention annulus.

7. A main rotor head and mast assembly for a helicopter, comprising:
   a main rotor head;
   a main rotor mast extending through said main rotor head and having a threaded outer surface;
   a main rotor mast nut having a threaded inner surface and being adapted to be threaded onto the threaded outer surface of said main rotor mast, thereby engaging said main rotor mast and said main rotor head; and
   a nut retention means for preventing disengagement of said mast nut and said mast should said nut crack or otherwise fail;
   wherein said nut retention means does not substantially assist in engaging said nut and said mast except in the event of nut cracking or failure.

8. The main rotor head and mast assembly as recited in claim 7, wherein said nut retention means closely surrounds said main rotor mast nut, such that there is substantially no space between said nut and said nut retention means.

9. The main rotor head and mast assembly as recited in claim 7, wherein said nut retention means comprises a substantially circular annulus having an inner circumferential surface.

10. The main rotor head and mast assembly as recited in claim 9, wherein said main rotor mast nut is substantially circular and has an outer circumferential surface, said nut retention annulus being adapted to closely surround said nut, such that there is substantially no space between the outer circumferential surface of said mast nut and the inner circumferential surface of said nut retention annulus.

11. The main rotor head and mast assembly as recited in claim 10, said main rotor head further comprising:
   a pitch housing adapted to support a plurality of rotor blades;
   a ring cap; and
   a main rotor top cap.

12. The main rotor head and mast assembly as recited in claim 7, wherein said nut retention means comprises a substantially circular annulus having an upwardly extending lip, said lip having an inner circumferential surface.

13. The main rotor head and mast assembly as recited in claim 12, wherein said main rotor mast nut is substantially circular and has an outer circumferential surface, said nut retention annulus being adapted to closely surround said nut, such that there is substantially no space between the outer circumferential surface of said mast nut and the inner circumferential surface of the lip of said nut retention annulus.

14. The main rotor head and mast assembly as recited in claim 13, said main rotor head further comprising:
   a pitch housing adapted to support a plurality of rotor blades;
   a ring cap; and
   a main rotor top cap.

15. A nut assembly, comprising:
   a nut having a threaded inner surface;
   a shaft having a threaded outer surface, said nut being adapted to be threaded onto said threaded outer surface of said shaft to engage said shaft; and
   a nut retention means comprising a substantially circular annulus having an upwardly extending lip, said lip having an inner circumferential surface, said nut retention means being adapted to prevent disengagement of said nut and said threaded shaft should said nut crack or otherwise fail,
   wherein said nut retention means does not substantially assist in engaging said nut and said shaft except in the event of nut cracking or failure.

16. The nut assembly as recited in claim 15, wherein said nut is substantially circular and has an outer circumferential surface, a nut retention annulus being adapted to closely surround said nut, such that there is substantially no space between the outer circumferential surface of said nut and the inner circumferential surface of said nut retention annulus.

17. The nut assembly as recited in claim 15, wherein said nut is substantially circular and has an outer circumferential surface, said nut retention annulus being adapted to closely surround said nut, such that there is substantially no space between the outer circumferential surface of said nut and the inner circumferential surface of the lip of said nut retention annulus.

* * * * *